March 5, 1963
D. W. VAN ROOYEN
3,079,696
IMPROVEMENTS IN GYROSCOPIC DIRECTIONAL DEVICES AND BOREHOLE
SURVEYINIG INSTRUMENTS INCORPORATING THE SAME
Filed May 1, 1961
2 Sheets-Sheet 1
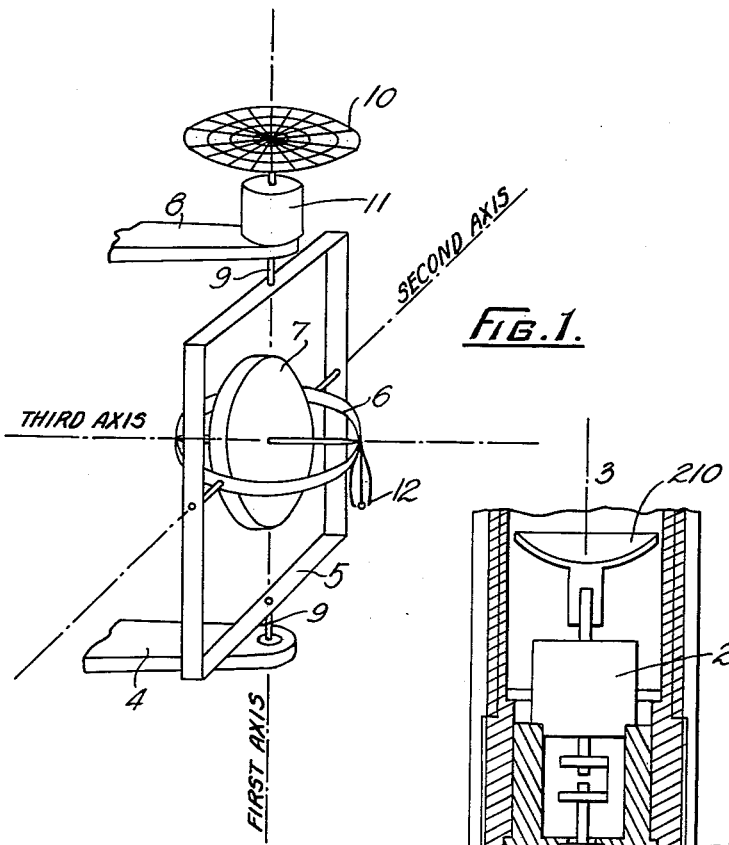
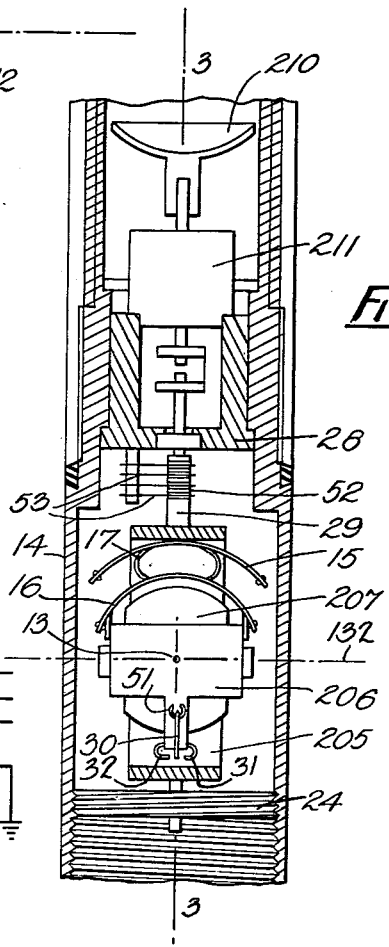
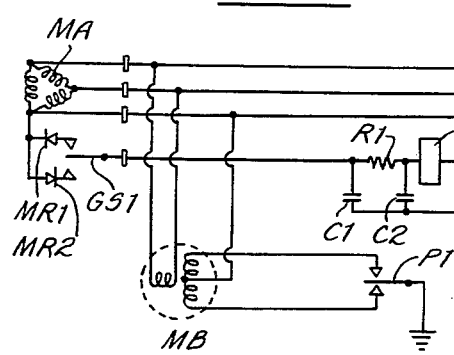
INVENTOR
DANIEL W. VAN ROOYEN
BY Irwin S. Thompson
ATTY.

March 5, 1963  D. W. VAN ROOYEN  3,079,696
IMPROVEMENTS IN GYROSCOPIC DIRECTIONAL DEVICES AND BOREHOLE
SURVEYINIG INSTRUMENTS INCORPORATING THE SAME
Filed May 1, 1961  2 Sheets-Sheet 2
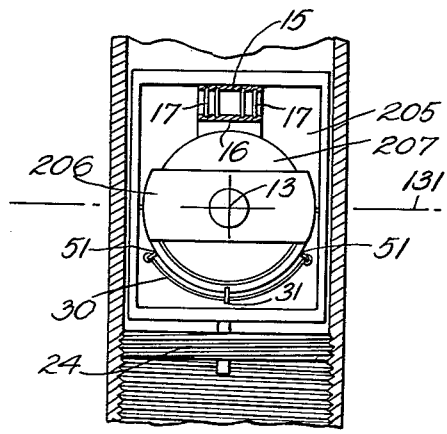
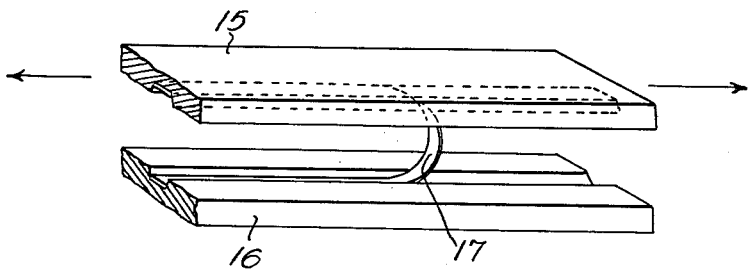
INVENTOR
DANIEL W. VAN ROOYEN
BY Irwin S. Thompson
ATTY.

United States Patent Office 3,079,696
Patented Mar. 5, 1963

3,079,696
IMPROVEMENTS IN GYROSCOPIC DIRECTIONAL DEVICES AND BOREHOLE SURVEYING INSTRUMENTS INCORPORATING THE SAME
Daniel W. van Rooyen, Atlantis House, corner Market and Fraser Sts., Johannesburg, Republic of South Africa
Filed May 1, 1961, Ser. No. 106,739
Claims priority, application Republic of South Africa May 3, 1960
7 Claims. (Cl. 33—204)

This invention relates to gyroscopic directional devices of the kind suitable for use in borehole surveying instruments.

Bore-hole surveying instruments incorporating gyroscopic directional devices have been known for many years, but these have been of large size, typically 5½" diameter, which excluded their use in diamond drill holes commonly employed in mining practice.

An object of the invention is to provide a gyro directional device that may be used in confined spaces such as bore-hole surveying instruments intended for holes of 2.4 inches or less.

In a directional device according to the invention all current supply means and control means on the directional device are contained in a cylinder concentric with the axis of the outer gimbal and touching the radially outer extremities of the outer gimbal.

Further according to the invention current paths are provided between the outer gimbal and the next inner gimbal by means of hairspring loops looped between grooved guides fixed on the two gimbals, the guides being concentric about the axis of the second gimbal.

The invention is further discussed with reference to the accompanying drawings, in which—

FIGURE 1 is a diagrammatic pictorial view of a directional device assembly,

FIGURE 2 is a longitudinal section through a directional device suitable for use in a borehole surveying instrument, FIGURE 3 is a part-section on the line 3—3 in FIGURE 2, FIGURE 4 is an enlarged perspective view illustrating the hairspring system, and FIGURE 5 is a wiring diagram of the instrument shown in FIGURES 2 and 3.

The illustration in FIGURE 1 shows a directional device of the kind here in question mounted on fixed frame members 4 and 8. On the frame is journalled for rotation in the normal way a first gimbal 5 which may rotate about a first axis as shown. Inside the first gimbal 5 is a second gimbal 6 mounted for rotation about a second axis as shown. Inside the second gimbal is a gyro wheel 7 mounted for rotation about a third axis as shown.

The wheel 7 is driven by means of an electrical motor in any convenient manner. For the sake of clarity the motor is not shown in FIGURE 1.

The upper portion of the shaft 9 of the gimbal 5 extends upwardly past the frame member 8 and carries a compass disc 10. Between the disc 10 and the member 8 there is a torque motor 11.

On the gimbal 6 there is a gravity switch 12. As shown diagrammatically the switch 12 has a swinging arm hanging between two contacts. As the gimbal 6 tilts about the second axis the arm contacts one or other of the contacts to cause current to flow in a circuit controlling the motor 11.

On tilting of the gimbal 6 the motor 11 is energized to cause the motor 11 to apply a torque to the shaft 9 in a direction calculated to cause precession of the third axis or the gimbal 6 back to the stable position.

In FIGURES 2 and 3 the principles as discussed above are applied to a directional device mounted in the casing of a borehole surveying instrument. In this case the first axis is the vertical axis or centre line 3—3 of the casing (FIGURE 2). The second axis is shown as on line 131 in FIGURE 3 and the third axis is normal to the paper in FIGURE 3 while it appears as a line 132 in FIGURE 2. The lines 131 and 132 are crossed at 13.

The frame thus is a tubular casing 14 adapted to be suitably enclosed. The casing has two webs 24 and 28 carrying bearings for the first gimbal 205. The gimbal shaft 29 extends upwardly past the upper bearing in the web 28 and is coupled to a torque motor 211. The motor shaft also extends upwardly and carries a disc 210. Lower down slip rings 52 and bushes 53 are provided to supply current and take off signals from the gravity switch.

A second gimbal is journalled to the first gimbal as set out above and carries a stator for a rotor 207 which is the spinning wheel. This type of construction is well known in the art.

The gimbals 205 and 206 have insulated guides 15 and 16 carrying grooves for hair springs 17 conducting current from slip rings 52 on the shaft 29. The grooves are concentric with the second axis. As the second gimbal 206 rotates, the loops in the hair springs rotate between the guides without introducing any torque about the second axis and without introducing appreciable friction. Four hair springs are required although only two can be seen in the illustration of FIGURE 2.

The arrangement of the hair springs 17 relatively to the guides 15 and 16 can be seen very clearly from FIGURE 4. The material used for the hair springs 17 and their dimensions must be so chosen as to give good conduction of current yet low frictional restraint when rolled in the manner described above and illustrated in the drawings. In the embodiment shown the springs 17 can accommodate a 60° tilt. In practice it has been found that commercially available hair springs of Phosphor bronze give excellent results.

It should be noted that this means of conducting current from the first to the second gimbal does not increase the dimension of the instrument in directions transverse to the first axis but only along the latter axis. This means that the casing 14 need just clear the extremities of the first gimbal 205. The diameter of the casing is thus dependent only on practical motor dimensions for the gyro wheel.

The motor constituted by the stator and rotor could be one running at 400 c.p.s. to give a theoretical speed of 24,000 r.p.m. which, in practice, becomes somewhat less due to friction.

The invention also provides a novel type of gravity switch for the mechanism that controls the attitude of the spinning axis 132.

The type of gravity switch normally used for this purpose consists of a tube containing a quantity of a conducting fluid, such as mercury, and contacts which touch the fluid when the tube is tilted to complete the circuits for the erection system. There is a practical limit to which the size of such a switch can be reduced, this limit being set by the surface tension of the liquid. This limiting size is too large for the instruments in which the compass here in question is to be used.

According to this invention the switch consists in a light member 30 which is made from thin gauge wire bent to form an arc and suspended from loops 51. The loops are secured to the second gimbal 206 but are insulated from it and form the connection to the moving contact of the switch.

The member 30 hangs freely between two contacts 31 and 32 fixed to, but insulated from, the second gimbal 206, in such a way that the member 30 does not touch either contact 31 or 32 when the axis 132 is in its normal position which is usually horizontal.

In order that the moving mass of the switch shall have a small effect on the balance of the gimbal 206, the member 30 should be as small as possible and its points of suspension should be as close to the axis 131 of rotation of the gimbal 206 as possible.

The member 30, the loops 51 and the contacts 31 and 32 should be made of, or coated with, gold, silver or some other good contact material.

As the contact pressure of the member 30 is low, its output is not suitable for the direct operation of the torque motor 211. For this reason an amplifying circuit must be interposed between the gravity switch and the torque motor.

As vibrations due to the spinning gyro wheel 207 cause contact chatter at the gravity switch, it is necessary to include an integrating circuit in the electrical connections to ensure that the erecting mechanism will only operate on sustained signals from the gravity switch.

A suitable electrical circuit is shown in FIGURE 5.

In the circuit diagram MA represents the windings of the stator of the motor driving the wheel 207. This is thus a three phase motor supplied in any convenient manner by means (not shown) from surface.

The member 30 and its contacts 31 and 32 are represented by the switch GS1 and the germanium rectifiers MR1 and MR2 are connected in the contacts. The torque motor circuit is represented by MB.

The output from the switch GS1 is fed to an integrating circuit comprising a resistor R1 and two condensers C1 and C2 in a $\pi$ connection. In tandem with this circuit is a relay P/1, which is a centre stable polarized relay. The integrating circuit ensures that the relay P/1 is only energized on sustained signals from the switch GS1. Depending on the direction of flow of the sustained signal a three position contact P1 in the torque motor circuit MB is closed to energize that motor to apply a torque in one or the other direction of rotation of the shaft 29 thus causing precession of the third axis back to the stable position.

In practice a directional device as described above has with ease been built into a borehole surveying instrument having a diameter of 2.25 inches. For this purpose a standard commercial spinning wheel 207 and its corresponding stator 206 were used.

I claim:
1. A directional device comprising an outer frame, a first gimbal journalled for rotation in the outer frame about a first axis, a second gimbal journalled for rotation in the first gimbal about a second axis normal to the first axis, a gyro wheel journalled for rotation in the second gimbal about a third axis normal to the second axis, electric motor means for rotating the wheel at a high speed including a stator on the second gimbal and a rotor on the gyro wheel, direction indicating means rotating with the first gimbal, gravity switch means on the second gimbal for detecting deflection of the third axis from its stable horizontal position, a torque motor for applying a torque to the first gimbal about the first axis, means responsive to the gravity switch means for so energizing the torque motor as to cause precession of the third axis back to the stable position, a first guide on the first gimbal, a second guide on the second gimbal, a plurality of pairs of opposed grooves in the guides, the grooves being concentric with the second axis, conducting hair spring loops between the members of each pair of opposed grooves, means to connect the ends of the loops on the first guide to current supply means, means to connect the ends of the selected loops on the second guide to the stator, and means to connect the end of at least one other loop on the second guide to the gravity switch means.

2. The directional device claimed in claim 1 in which the gravity switch means consists in a light wire member bent to form an arc concentric with the second axis, loops on the second gimbal from which the wire member is suspended and a pair of contacts on the second gimbal straddling the wire member in such a way that the member does not touch the contacts when the third axis is horizontal.

3. A directional device comprising an outer frame, a first gimbal journalled for rotation in the outer frame about a first axis, a second gimbal journalled on the first gimbal for rotation about a second axis normal to the first axis, a gyro wheel journalled for rotation in the second gimbal about a third axis normal to the second axis, electric motor means for rotating the wheel at high speed, direction indicating means rotating with the first gimbal, gravity switch means on the second gimbal for detecting deflection of the third axis from its stable horizontal position, means responsive to the switch means for applying a torque to the first gimbal about the first axis in a direction calculated to cause precession of the third axis back to the stable position, and means for providing a plurality of current paths between the first and second gimbal such means including grooved guides on the first gimbal with the grooves facing the second gimbal, grooved guides on the second gimbal with the latter grooves concentric and co-planar with the grooves on the first gimbal and hair spring loops looped between opposed grooves, the whole device being contained in a casing concentric with the first axis and just clear of the radially outer extremities of the first gimbal.

4. A directional device comprising an outer frame, a first gimbal journalled for rotation in the outer frame about a first axis, a second gimbal journalled on the first gimbal for rotation about a second axis normal to the first axis, a gyro wheel journalled for rotation in the second gimbal about a third axis normal to the second axis, electric motor means for rotating the wheel at high speed, direction indicating means rotating with the first gimbal, gravity switch means on the second gimbal for detecting deflection of the third axis from its stable horizontal position, means responsive to the switch means for applying a torque to the first gimbal about the first axis in a direction calculated to cause precession of the third axis back to the stable position, and means for providing a plurality of current paths between the first and second gimbal such means including a guide on the first gimbal, a guide on the second gimbal, a plurality of pairs of opposed grooves in the two guides, the grooves being concentric with the second axis and conducting hair spring loops looped between the members of each pair of opposed grooves, the whole device being contained in a casing concentric with the first axis and just clear of the radially outer extremities of the first gimbal.

5. A directional device comprising an outer frame, a first gimbal journalled for rotation in the outer frame about a first axis, a second gimbal journalled on the first gimbal for rotation about a second axis normal to the first axis, a gyro wheel journalled for rotation in the second gimbal about a third axis normal to the second axis, electric motor means for rotating the wheel at high speed, direction indicating means rotating with the first gimbal, gravity switch means on the second gimbal for detecting deflection of the third axis from its stable horizontal position, such gravity switch means consisting in a light wire member bent to form an arc concentric with the second axis, loops on the second gimbal from which the wire member is supended and a pair of contacts on the second gimbal straddling the wire member in such a way that the member does not touch the contacts when the third axis is stable, the whole device being contained in a casing concentric with the first axis and just clear of the radially outer extremities of the first gimbal.

6. The directional device claimed in claim 5 including two opposite polarity determining means with each member of the pair of contacts connected to one such means.

7. The directional device claimed in claim 5 in which the means responsive to the gravity switch means includes an integrating circuit to cause torque to be applied to the first gimbal only on sustained signals from the gravity switch means.

References Cited in the file of this patent

UNITED STATES PATENTS

| | | |
|---|---|---|
| 1,912,768 | Gilbert | June 6, 1933 |
| 2,887,783 | Blizard | May 26, 1959 |